United States Patent [19]
Doi

[11] Patent Number: 5,901,125
[45] Date of Patent: May 4, 1999

[54] RECORDING AND REPRODUCING OPTICAL DISK DEVICE WITH MULTI-DISK TYPE CAPABILITY

[75] Inventor: Akihiko Doi, Tokyo, Japan

[73] Assignee: Kabushiki Kaisha Toshiba, Kawasaki, Japan

[21] Appl. No.: 08/796,410

[22] Filed: Feb. 6, 1997

[30] Foreign Application Priority Data

Feb. 7, 1996 [JP] Japan ................................... 8-021293

[51] Int. Cl.$^6$ .................................................. G11B 7/00
[52] U.S. Cl. ........................... 369/58; 369/116; 369/44.38
[58] Field of Search ................................. 369/58, 32, 110, 369/44.23, 44.26, 44.38, 112, 116, 44.12, 44.37, 44.28, 13; 360/78.04, 77.01, 77.02

[56] References Cited

U.S. PATENT DOCUMENTS 4,918,676  4/1990  Miyasaka ................................... 369/32

FOREIGN PATENT DOCUMENTS 556 446 A1  8/1993  European Pat. Off. .

OTHER PUBLICATIONS

Vol. 016, No. 373 (P–1400), Aug. 11, 1992 & JP 04 117626 A, Apr. 17, 1992.
Vol. 015, No. 335 (P–1242), Aug. 26, 1991 & JP 03 122821 A, May 24, 1991.
Vol. 010, No. 338 (P–516), Nov. 15, 1986 & JP 61 139939 A, Jun. 27, 1986.
Vol. 014, No. 048 (P–0997), Jan. 29, 1990 & JP 01 276440 A, Nov. 7, 1989.
Vol. 096, No. 005, May 31, 1996 & JP08 007280 A, Jan. 12, 1996.

Primary Examiner—Ali Neyzari
Attorney, Agent, or Firm—Pillsbury Madison & Sutro LLP

[57] ABSTRACT

In an optical disk device with various types of optical disks, the amounts of light are set for the various types of optical disks by emitting laser light from a semiconductor laser oscillator while sequentially increasing the light amount thereof for the optical disks in an order from the optical disk of the smallest set light amount. That is, first, whether or not an optical disk of CD, CD-ROM or DVD-ROM can be suitably used is determined based on the amount of reflection light from the optical disk obtained by causing the semiconductor laser oscillator to emit laser light in the smallest light amount setting state, and if it is not determined that the optical disk can be suitably used, the light amount is raised to a level higher than the lowest light amount set level by one level.

4 Claims, 11 Drawing Sheets

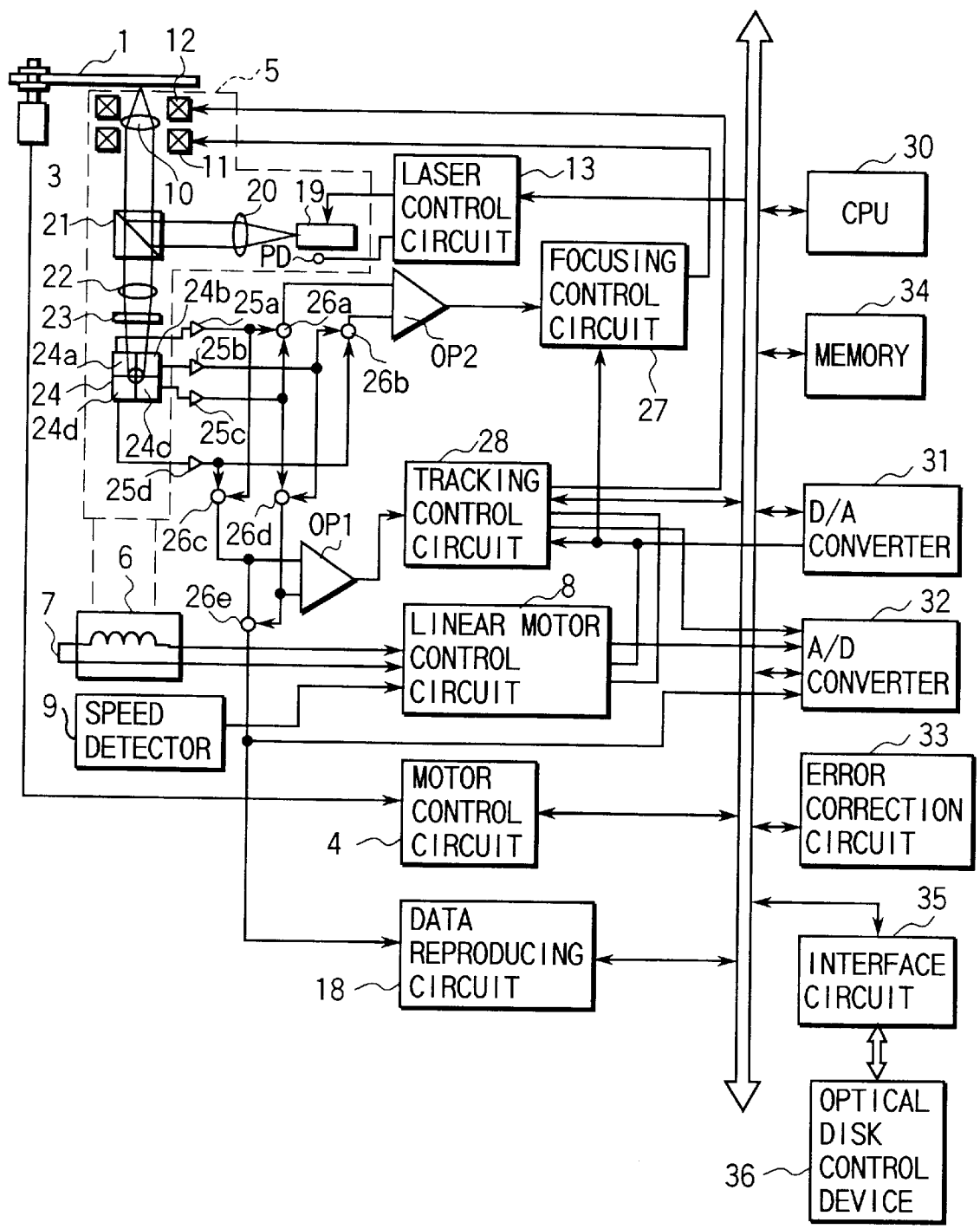
F I G. 1

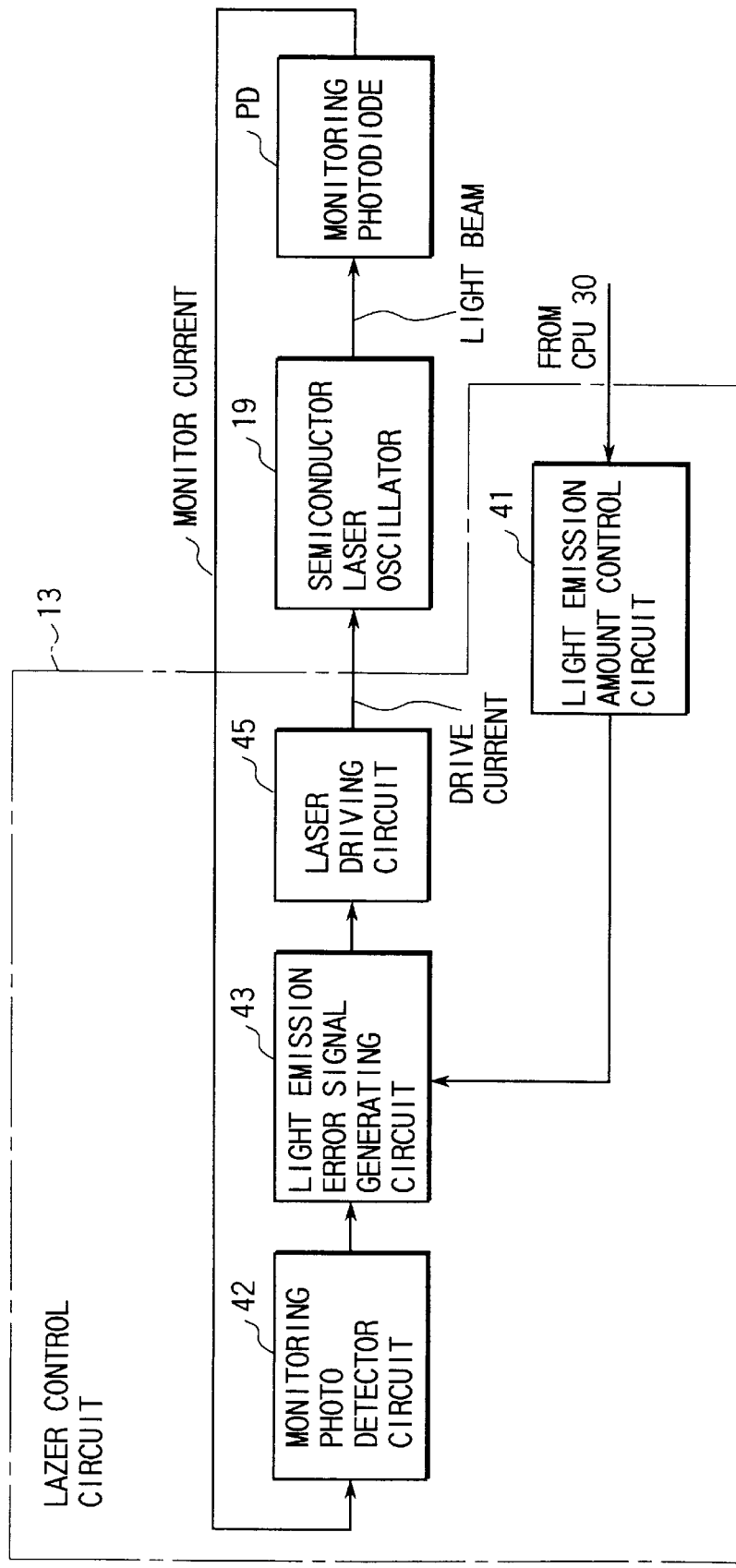
F I G. 7

RECORDING AND REPRODUCING OPTICAL DISK DEVICE WITH MULTI-DISK TYPE CAPABILITY

BACKGROUND OF THE INVENTION

This invention relates to a recording/reproducing optical disk device for recording data on various types of optical disks and reproducing data recorded on the optical disks and a reproduction-only (read-only) optical disk device for reproducing data recorded on various types of optical disks.

Conventionally, an optical disk device for recording data on an optical disk having recording tracks by use of laser light output from a semiconductor laser oscillator mounted on an optical head or reproducing data recorded on the optical disk is put into practical use.

In the above optical device, at most two types of optical disks can be dealt with in the prior art and the types of the optical disks are determined by using an additional sensor which detects the presence or absence of a cartridge, which loads the optical disk or an ID hole formed in the cartridge.

If the number of optical disk types used increase, they cannot be correctly identified by the prior art method or, if they can, the cost becomes prohibitively high, because the number of ID hole sensors increases. Further, in a case where the optical disk, originally loaded into the cartridge and is subsequently removed, determination of the optical disk cannot be made accurately. If the determination is erroneous, there occurs the possibility that power, much greater than the optimum tolerable power of each optical disk is applied to the optical disk, resulting in the desctruction of information data, particularly in the case of a recording optical disk.

BRIEF SUMMARY OF THE INVENTION

An object of this invention is to provide an optical disk device capable of preventing light of an amount larger than an adequate amount from being applied to various types of optical disks and preventing data on the optical disk from being destroyed without using a special sensor.

According to one aspect of this invention, there is provided an optical disk device for recording data on an optical disk or reproducing data recorded on an optical disk, comprising laser light emitting means for selectively emitting one of laser lights of different light amounts at plural levels; detecting means for detecting an amount of reflection light obtained by applying laser light emitted from the laser light emitting means to the optical disk; determining means for causing the laser light emitting means to sequentially emit the laser lights starting from the laser light of the smallest light amount and determining whether the reflection light amount detected by the detecting means is adequate or not for each light amount of the laser light; and processing means for recording or reproducing data by use of the laser light of a light amount emitted from the laser light emitting means when the determining means determines that the amount of reflection light is adequate.

According to another aspect of this invention, there is provided an optical disk device for recording data on an optical disk or reproducing data recorded on an optical disk, comprising laser light emitting means for selectively emitting one of laser lights of different light amounts and different frequencies at plural levels; detecting means for detecting an amount of reflection light obtained by applying laser light emitted from the laser light emitting means to the optical disk; determining means for causing the laser light emitting means to sequentially emit the laser lights starting from the laser light of the smallest light amount and determining whether the reflection light amount detected by the detecting means is adequate or not for each light amount of the laser light; and processing means for recording or reproducing data by use of the laser light of a light amount emitted from the laser light emitting means when the determining means determines that the amount of reflection light is adequate.

According to still another aspect of this invention, there is provided an optical disk device for recording data on an optical disk or reproducing data recorded on an optical disk, comprising laser light emitting means for selectively emitting one of laser lights of different light amounts at plural levels; light converging means for converging the laser light emitted from the laser light emitting means onto the optical disk; moving means for moving the light converging means in a direction along the optical axis thereof; detecting means for detecting the amplitude of an amount of reflection light obtained by moving the light converging means by the moving means and applying laser light emitted from the laser light emitting means to the optical disk; determining means for causing the laser light emitting means to sequentially emit the laser lights starting from the laser light of the smallest light amount when the optical disk is loaded and determining whether the reflection light amount is adequate or not based on the amplitude of the reflection light amount detected by the detecting means for each light amount of the laser light; and processing means for recording or reproducing data by use of the laser light of a light amount emitted from the laser light emitting means when the determining means determines that the amount of reflection light is adequate.

According to another aspect of this invention, there is provided an optical disk device for recording data on an optical disk or reproducing data recorded on an optical disk, comprising laser light emitting means for selectively emitting laser light of first light amount or laser light of a second light amount larger than the first light amount; photoelectric converting means for photoelectrically converting reflection light obtained by applying laser light emitted from the laser light emitting means to the optical disk and supplying a corresponding output; first processing means for driving the laser light emitting means to emit laser light of the first light amount; first determining means for determining whether an optical disk whose recording or reproducing operation is effected by use of the laser light of the first light amount is loaded or not according to an output derived from the photoelectric converting means while the process by the first processing means is effected; first execution means for effecting the recording or reproducing operation by use of laser light of the first light amount when the first determining means determines that an optical disk whose recording or reproducing operation is effected by use of the laser light of the first light amount is loaded; second processing means for driving the laser light emitting means to emit laser light of the second light amount larger than the first light amount when the first determining means determines that an optical disk whose recording or reproducing operation is effected by use of the laser light of the first light amount is not loaded; second determining means for determining whether an optical disk whose recording or reproducing operation is effected by use of laser light of the second light amount is loaded or not according to an output derived from the photoelectric converting means while the process by the second processing means is effected; and second execution means for effecting the recording or reproducing operation by use of laser light of the second light amount when the second determining means determines that an optical disk whose recording or reproducing operation is effected by use of the laser light of the second light amount is loaded.

According to another aspect of this invention, there is provided an optical disk device for reproducing data recorded on an optical disk, comprising laser light emitting means for selectively emitting one of laser lights of different light amounts at plural levels; detecting means for detecting an amount of reflection light obtained by applying laser light emitted from the laser light emitting means to the optical disk; determining means for causing the laser light emitting means to sequentially emit the laser lights starting from the laser light of the smallest light amount and determining whether the reflection light amount detected by the detecting means is adequate or not for each light amount of the laser light; and processing means for reproducing data by use of the laser light of a light amount emitted from the laser light emitting means when the determining means determines that the amount of reflection light is adequate.

According to another aspect of this invention, there is provided an optical disk device for reproducing data recorded on an optical disk, comprising laser light emitting means for selectively emitting one of laser lights of different light amounts and different frequencies at plural levels; detecting means for detecting an amount of reflection light obtained by applying laser light emitted from the laser light emitting means to the optical disk; determining means for causing the laser light emitting means to sequentially emit the laser lights starting from the laser light of the smallest light amount and determining whether the reflection light amount detected by the detecting means is adequate or not for each light amount of the laser light; and processing means for reproducing data by use of the laser light of a light amount emitted from the laser light emitting means when the determining means determines that the amount of reflection light is adequate.

According to still another aspect of this invention, there is provided an optical disk device for reproducing data recorded on an optical disk, comprising laser light emitting means for selectively emitting one of laser lights of different light amounts at plural levels; light converging means for converging the laser light emitted from the laser light emitting means onto the optical disk; moving means for moving the light converging means in a direction along the optical axis thereof; detecting means for detecting the amplitude of an amount of reflection light obtained by moving the light converging means by the moving means and applying laser light emitted from the laser light emitting means to the optical disk; determining means for causing the laser light emitting means to sequentially emit the laser lights starting from the laser light of the smallest light amount when the optical disk is loaded and determining whether the reflection light amount is adequate or not based on the amplitude of the reflection light amount detected by the detecting means for each light amount of the laser light; and processing means for reproducing data by use of the laser light of a light amount emitted from the laser light emitting means when the determining means determines that the amount of reflection light is adequate.

According to another aspect of this invention, there is provided an optical disk device for reproducing data recorded on an optical disk, comprising laser light emitting means for selectively emitting laser light of first light amount or laser light of a second light amount larger than the first light amount; photoelectric converting means for photoelectrically converting reflection light obtained by applying laser light emitted from the laser light emitting means to the optical disk and supplying a corresponding output; first processing means for driving the laser light emitting means to emit laser light of the first light amount; first determining means for determining whether an optical disk whose reproducing operation is effected by use of the laser light of the first light amount is loaded or not according to an output derived from the photoelectric converting means while the process by the first processing means is effected; first execution means for effecting the reproducing operation by use of laser light of the first light amount when the first determining means determines that an optical disk whose reproducing operation is effected by use of the laser light of the first light amount is loaded; second processing means for driving the laser light emitting means to emit laser light of the second light amount larger than the first light amount when the first determining means determines that an optical disk whose reproducing operation is effected by use of the laser light of the first light amount is not loaded; second determining means for determining whether an optical disk whose reproducing operation is effected by use of laser light of the second light amount is loaded or not according to an output derived from the photoelectric converting means while the process by the second processing means is effected; and second execution means for effecting the reproducing operation by use of laser light of the second light amount when the second determining means determines that an optical disk whose reproducing operation is effected by use of the laser light of the second light amount is loaded.

According to still another aspect of this invention, there is provided an optical disk device for reproducing data recorded on an optical disk, comprising laser light emitting means for selectively emitting laser light of first light amount and first frequency, laser light of a second light amount larger than the first light amount and the first frequency, or laser light of third light amount larger than the second light amount and a second frequency higher than the first frequency; photoelectric converting means for photoelectrically converting reflection light obtained by applying laser light of one of the first to third light amounts emitted from the laser light emitting means to the optical disk and supplying a corresponding output; first processing means for driving the laser light emitting means to emit laser light of the first light amount and first frequency; first determining means for determining whether an optical disk whose reproducing operation is effected by use of the laser light of the first light amount and first frequency is loaded or not according to an output derived from the photoelectric converting means while the process by the first processing means is effected; first execution means for effecting the reproducing operation by use of laser light of the first light amount when the first determining means determines that an optical disk whose reproducing operation is effected by use of the laser light of the first light amount and first frequency is loaded; second processing means for driving the laser light emitting means to emit laser light of the second light amount larger than the first light amount and first frequency when the first determining means determines that an optical disk whose reproducing operation is effected by use of the laser light of the first light amount and first frequency is not loaded; second determining means for determining whether an optical disk whose reproducing operation is effected by use of laser light of the second light amount and first frequency is loaded or not according to an output derived from the photoelectric converting means while the process by the second processing means is effected; second execution means for effecting the reproducing operation by use of laser light of the second light amount and first frequency when the second determining means determines that an optical disk whose reproducing operation is effected by use of the laser light of the second light amount and first frequency is loaded; third processing means for driving the laser light emitting means to emit laser light of the third light amount larger than the second light amount and the second frequency when the second determining means determines that an optical disk whose reproducing operation is effected by use of the laser light of the second light amount and first frequency is not loaded; third determining means for determining whether an optical disk whose reproducing operation is effected by use of laser light of the third light amount and second frequency is loaded or not according to an output derived from the photoelectric converting means while the process by the third processing means is effected; and third execution means for effecting the reproducing operation by use of laser light of the third light amount and second frequency when the third determining means determines that an optical disk whose reproducing operation is effected by use of the laser light of the third light amount and second frequency is loaded.

According to another aspect of this invention, there is provided an optical disk device for reproducing data recorded on an optical disk, comprising laser light emitting means for selectively emitting laser light of first light amount and first frequency, laser light of a second light amount larger than the first light amount and the first frequency, or laser light of a third light amount larger than the second light amount and a second frequency higher than the first frequency; light converging means for converging the laser light of one of the first to third light amounts emitted from the laser light emitting means onto the optical disk; moving means for moving the light converging means in a direction along the optical axis thereof; detecting means for detecting the amplitude of an amount of reflection light obtained by applying laser light of one of the first to third light amounts emitted from the laser light emitting means by driving the laser light emitting means to the optical disk; first processing means for driving the laser light emitting means to emit laser light of the first light amount and first frequency when the optical disk is loaded; first determining means for determining whether an optical disk whose reproducing operation is effected by use of the laser light of the first light amount and first frequency is loaded or not based on the amplitude of an amount of reflection light detected by the detecting means while the process by the first processing means is effected; first execution means for effecting the reproducing operation by use of laser light of the first light amount when the first determining means determines that an optical disk whose reproducing operation is effected by use of the laser light of the first light amount and first frequency is loaded; second processing means for driving the laser light emitting means to emit laser light of the second light amount larger than the first light amount and first frequency when the first determining means determines that an optical disk whose reproducing operation is effected by use of the laser light of the first light amount and first frequency is not loaded; second determining means for determining whether an optical disk whose reproducing operation is effected by use of laser light of the second light amount and first frequency is loaded or not based on the amplitude of an amount of reflection light detected by the detecting means while the process by the second processing means is effected; second execution means for effecting the reproducing operation by use of laser light of the second light amount and first frequency when the second determining means determines that an optical disk whose reproducing operation is effected by use of the laser light of the second light amount and first frequency is loaded; third processing means for driving the laser light emitting means to emit laser light of the third light amount larger than the second light amount and the second frequency higher than the first frequency when the second determining means determines that an optical disk whose reproducing operation is effected by use of the laser light of the second light amount is not loaded; third determining means for determining whether an optical disk whose reproducing operation is effected by use of laser light of the third light amount and second frequency is loaded or not based on the amplitude of an amount of reflection light detected by the detecting means while the process by the third processing means is effected; and third execution means for effecting the reproducing operation by use of laser light of the third light amount and second frequency when the third determining means determines that an optical disk whose reproducing operation is effected by use of the laser light of the third light amount and second frequency is loaded.

According to still another aspect of this invention, there is provided a recording/reproducing method for recording data on an optical disk or reproducing data recorded on an optical disk, comprising the steps of selectively emitting one of laser lights of different light amounts at plural levels; detecting an amount of reflection light obtained by applying the emitted laser light to the optical disk; sequentially emitting the laser lights starting from the laser light of the smallest light amount and determining whether the detected reflection light amount is adequate or not for each light amount of the laser light; and recording or reproducing data by use of the laser light of a light amount emitted when it is determined in the determining step that the amount of reflection light is adequate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the schematic construction of an optical disk device for illustrating one embodiment of this invention;

FIG. 7 is a block diagram showing the schematic construction of a laser control circuit in another embodiment of this invention.

DETAILED DESCRIPTION OF THE INVENTION

Figure 2:
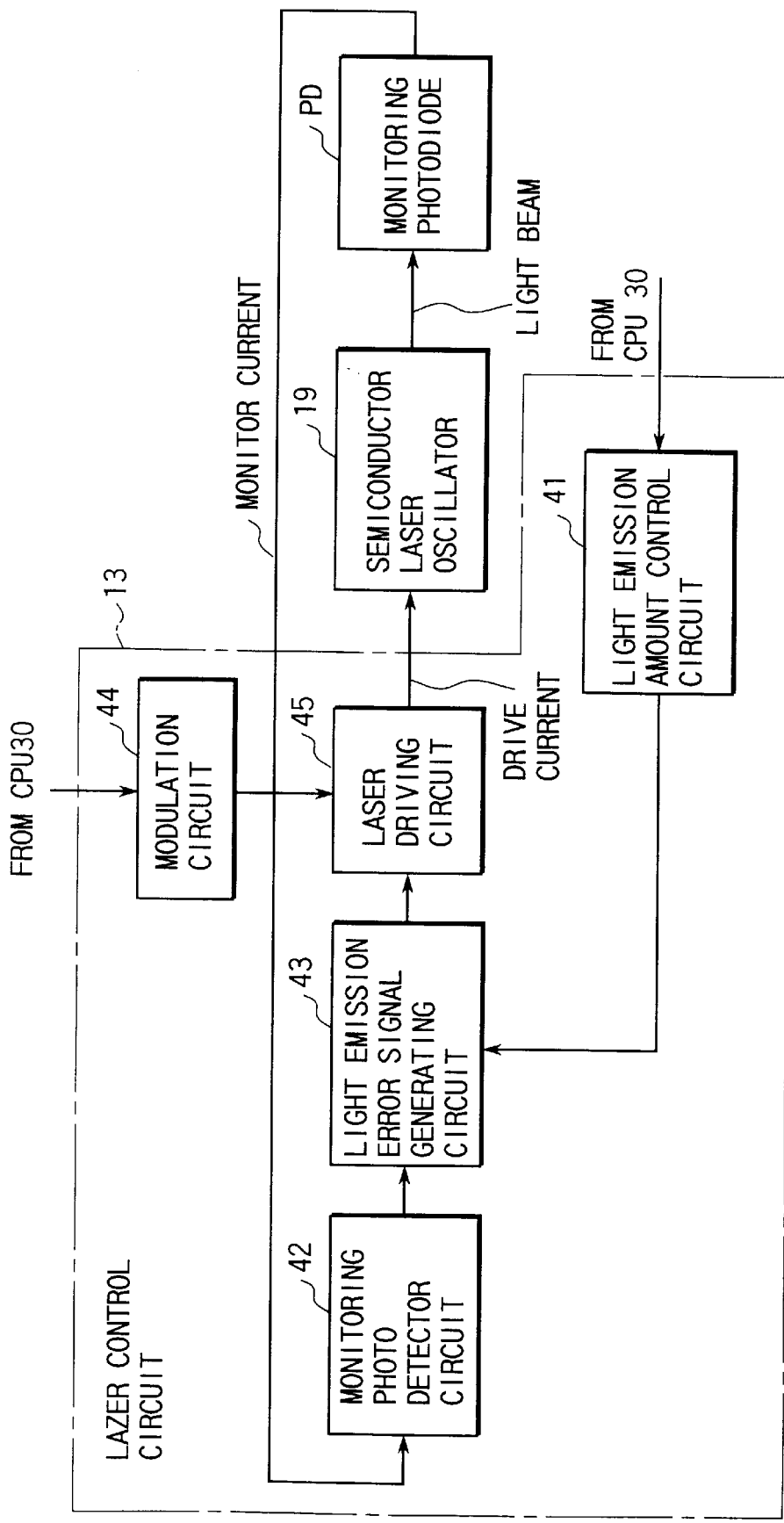
FIG. 2 is a block diagram showing the schematic construction of a laser control circuit of FIG. 1.

The following is a description of an embodiment of this invention with reference to the accompanying drawings.

FIG. 1 shows an optical disk device as an information recording/reproducing device. The optical disk device records data (information) on an optical disk 1 by use of convergence light or reproduces data recorded on the optical disk.

As the optical disk 1, various types of optical disks can be selectively loaded.

For example, as the optical disk 1, a reproduction-only (read-only) CD (compact disk), data recording CD-ROM, write once (recording once) type CD-R, reproduction-only DVD (digital video data, digital versatile disk) -ROM, DVD-RAM capable of repeatedly effecting the recording and reproducing operations, or write once (recording once) type DVD-R can be selectively loaded.

In the case of CD or CD-ROM, laser light emitted from a semiconductor laser, 19 which will be described later, has a light amount of 0.3 mW and wavelength of 780 nm; in the case of DVD-ROM, laser light emitted from the semiconductor laser 19 has a light amount of 0.5 mW and wavelength of 680 nm; in the case of CD-R, laser light emitted from the semiconductor laser 19 has a light amount of 0.5 mW and wavelength of 780 nm; and in the case of DVD-RAM or DVD-R, laser light emitted from the semiconductor laser 19 has a light amount of 1.0 mW and wavelength of 680 nm.

On the surface of the optical disk 1, grooves and lands are formed in a concentric or spiral form.

The optical disk 1 may be of a perforation type, a recording layer type, or multi-phase recording film type using the phase change. Further, a magneto-optical disk may be used. In such a case, the structure of the optical head is changed significantly. A portion including a recorded signal on the optical disk is called a track and the track is formed from a combination of a groove and a land, or only a groove or only a land.

Further, in FIG. 1, the optical disk 1 is rotated, for example, at a constant speed by a motor 3. The motor 3 is controlled by a motor control circuit 4.

The operation of recording information on the optical disk 1 or reproducing information recorded on the optical disk 1 is effected by an optical head 5. The optical head 5 is fixed on a driving coil 7 constituting a movable portion of a linear motor 6 and the driving coil 7 is connected to a linear motor control circuit 8.

To the linear motor control circuit 8, a speed detector 9 is connected and a speed signal of the optical head is transmitted to the linear motor control circuit 8.

A permanent magnet (not shown) is mounted on a fixed portion of the linear motor 6, and if the driving coil 7 is excited by the linear motor control circuit 8, the optical head 5 is moved in a radial direction of the optical disk 1.

An objective lens 10 is supported on the optical head 5 by use of a wire or leaf spring (not shown) and the objective lens 10 is moved in a focusing direction (optical axis direction of the lens) by a driving coil 11 and in a tracking direction (direction perpendicular to the optical axis of the lens) by a driving coil 12.

Further, a semiconductor laser oscillator 19 is driven by a laser control circuit 13 to selectively emit laser lights corresponding to various optical disks 1 according to a switching signal from a CPU 30 which will be described later. The laser control circuit 13 corrects the light amount of laser light from the semiconductor laser oscillator 19 according to a monitoring current from a photodiode PD for monitoring the semiconductor laser oscillator 19.

The laser control circuit 13 is operates in synchronism with a recording clock signal from a PLL circuit (not shown). The PLL circuit divides the frequency of a basic clock signal from an oscillator (not shown) to obtain a frequency corresponding to the recording position on the optical disk 1 and thus produces the recording clock signal.

Laser light emitted from the semiconductor laser oscillator 19 driven by a laser driving circuit 45 of the laser control circuit 13 is applied onto the optical disk 1 via a collimator lens 20, half prism 21 and objective lens 10 and the reflection light from the optical disk 1 is guided to a photo detector 24 via the objective lens 10, half prism 21, light converging lens 22 and cylindrical lens 23.

The photo detector 24 is constructed by four-divided photo detector cells 24a, 24b, 24c and 24d.

An output signal of the photo detector cell 24a of the photo detector 24 is supplied to one input terminal of an adder 26a via an amplifier 25a, an output signal of the photo detector cell 24b is supplied to one input terminal of an adder 26b via an amplifier 25b, an output signal of the photo detector cell 24c is supplied to the other input terminal of the adder 26a via an amplifier 25c, and an output signal of the photo detector cell 24d is supplied to the other input terminal of the adder 26b via an amplifier 25d.

Further, the output signal of the photo detector cell 24a of the photo detector 24 is supplied to one input terminal of the adder 26c via the amplifier 25a, the output signal of the photo detector cell 24b is supplied to one input terminal of the adder 26d via the amplifier 25b, the output signal of the photo detector cell 24c is supplied to the other input terminal of the adder 26d via the amplifier 25c, and the output signal of the photo detector cell 24d is supplied to the other input terminal of the adder 26c via the amplifier 25d.

An output signal of the adder 26a is supplied to an inverting input terminal of a differential amplifier OP2 and an output signal of the adder 26b is supplied to the non-inverting input terminal of the differential amplifier OP2. Therefore, the differential amplifier OP2 supplies a signal (focus error signal) relating to the focus point and corresponding to a difference between the output signals of the adders 26a and 26b to a focusing control circuit 27. An output signal of the focusing control circuit 27 is supplied to the focusing driving circuit 11 to control the laser light to be always exactly focused on the optical disk 1.

An output signal of the adder 26c is supplied to an inverting input terminal of a differential amplifier OP1 and an output signal of the adder 26d is supplied to the non-inverting input terminal of the differential amplifier OP1. Therefore, the differential amplifier OP1 supplies a tracking error signal corresponding to a difference between the output signals of the adders 26c and 26d to a tracking control circuit 28. The tracking control circuit 28 creates a track driving signal according to a tracking error signal supplied from the differential amplifier OP1.

The track driving signal output from the tracking control circuit 28 is supplied to the driving circuit 12 for driving in the tracking direction. The tracking error signal used in the tracking control circuit 28 is supplied to the linear motor control circuit 8.

A sum signal of the outputs of the photo detector cells 24a to 24d of the photo detector 24 after focusing and tracking, that is, a signal obtained by adding the output signals of the adders 26c and 26d in an adder 26e reflects a variation in the reflectance of a pit recording information) formed on the track. The signal is supplied to a data reproducing circuit 18 which in turn reproduces recorded data.

Reproduced data reproduced in the data reproducing circuit 18 is output to an error correction circuit 33 via a bus 29. The error correction circuit 33 corrects errors by use of an error correction code ECC in the reproduced data or attaches an error correction code ECC to recording data supplied from an interface circuit 35 and then outputs the data to a memory 34.

The reproduced data subjected to the error correction in the error correction circuit 33 is output to an optical disk control device 36 used as an external device via the bus 29 and interface circuit 35. Recording data is supplied from the optical disk control device 36 to the error correction circuit 33 via the interface circuit 35 and bus 29.

Further, while the objective lens 10 is moved by the tracking control circuit 28, the linear motor control circuit 8 drives the linear motor 6 or moves the optical head 5 so as to place the objective lens 10 in or near the central position of the optical head 5.

Further, the optical disk device includes a D/A converter 31 and A/D converter 32 used for permitting information transfer between the CPU 30 for controlling the whole portion of the optical disk device and the focusing control circuit 27, tracking control circuit 28 and linear motor control circuit 8.

The motor control circuit 4, linear motor control circuit 8, laser control circuit 13, data reproducing circuit 18, focusing control circuit 27, tracking control circuit 28, error correction circuit 33 and the like are controlled by the CPU 30 via the bus 29 and the CPU 30 is designed to perform preset operations according to programs stored in the memory 34.

When the optical disk 1 is loaded in the optical disk device and an amount of reflection light in the innermost circumference is read, a sum signal of the outputs of the photo detector cells 24a to 24d of the photo detector 24, that is, an output signal of the adder 26e is supplied to the CPU 30 via the A/D converter 32 and bus 29.

As shown in FIG. 2, the laser control circuit 13 includes a light emission amount control circuit 41, monitoring photo detector circuit 42, light emission error signal generating circuit 43, modulation circuit 44 and laser driving circuit 45.

The light emission amount control circuit 41 is a circuit for selectively setting laser light from the semiconductor laser oscillator 19 to one of various light emission amounts according to a switching signal from the CPU 30.

The monitoring photo detector circuit 42 detects the current value of a monitor current from the monitoring photodiode PD.

The light emission error signal generating circuit 43 applies a voltage corresponding to the light emission amount set by the light emission amount control circuit 41 to the laser driving circuit 45 and corrects the voltage applied to the laser driving circuit 45 according to a current value from the monitoring photo detector circuit 42.

That is, the light emission error signal generating circuit 43 sets the light emitting condition of laser light from the semiconductor laser oscillator 19 to the minimum light amount (0.3 mW) and the maximum wavelength (780 nm); a light amount (0.5 mW) larger than the minimum light amount by one level and a wavelength (650 nm) shorter than the maximum wavelength; the light amount (0.5 mW) larger than the minimum light amount by one level and the maximum wavelength (780 nm); or a light amount (1.0 mW) larger than the minimum light amount by two levels and the wavelength (650 nm) shorter than the maximum wavelength according to the set content from the light emission amount control circuit 41, and controls the laser driving circuit 45 according to the set light emitting condition to drive the semiconductor laser oscillator 19.

The modulation circuit 44 modulates recording data supplied from the error correction circuit 33 to a signal suitable for recording, that is, 8-16 modulation data.

The laser driving circuit 45 drives the semiconductor laser oscillator 19 in the optical head 5 by a driving current corresponding to a voltage value applied from the light emission error signal generating circuit 43 at the time of reproduction and drives the semiconductor laser oscillator 19 in the optical head 5 by a driving current for recording according to 8-16 modulation data modulated by the modulation circuit 44 in a state in which the semiconductor laser oscillator 19 in the optical head 5 is driven by a driving current corresponding to a voltage value applied from the light emission error signal generating circuit 43 at the time of data recording.

Figure 3:
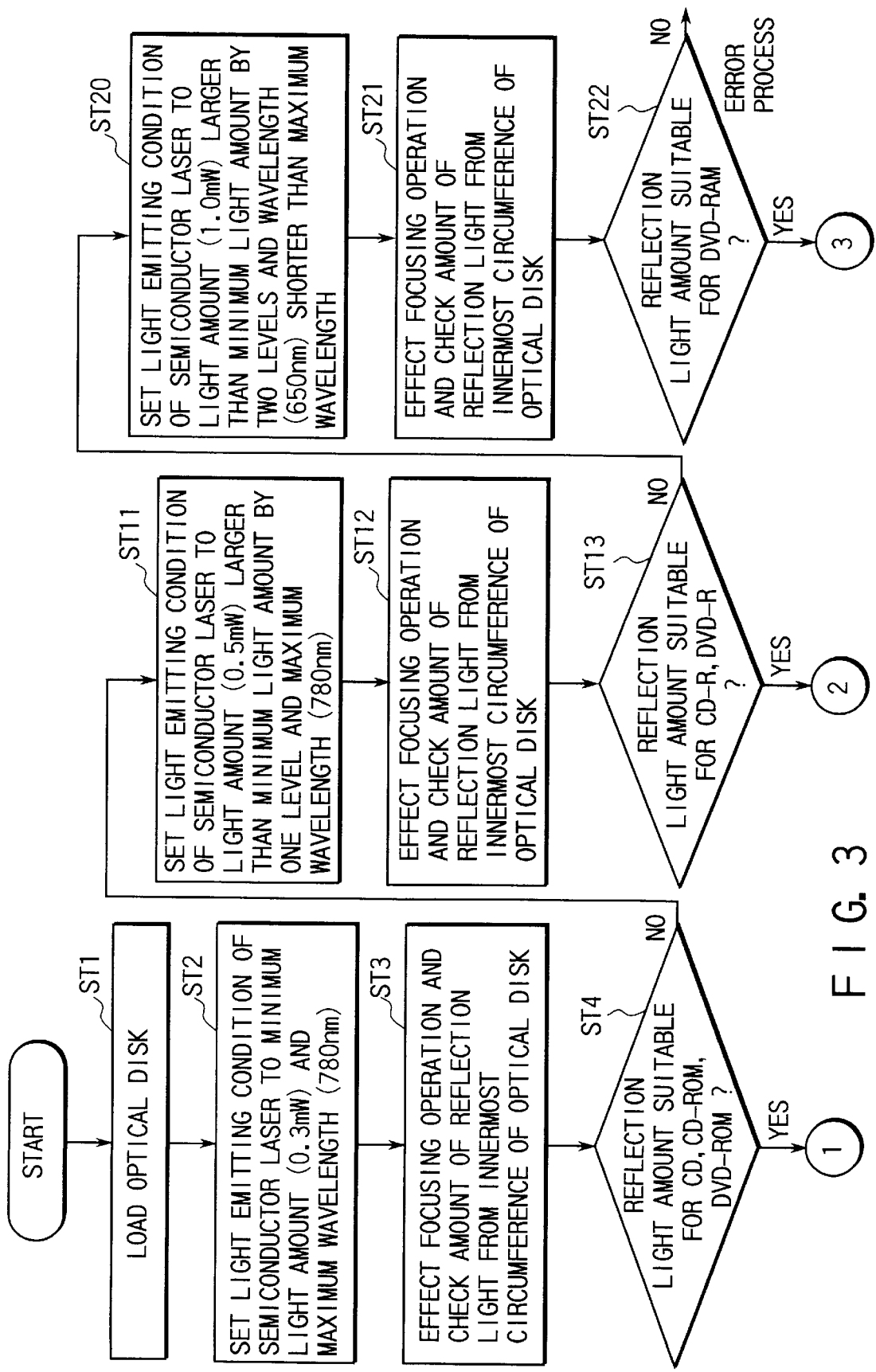
FIGS. 3, 4, 5 and 6 are flowcharts for illustrating the light amount controlling process of a semiconductor laser oscillator of FIG. 1.
Figure 4:
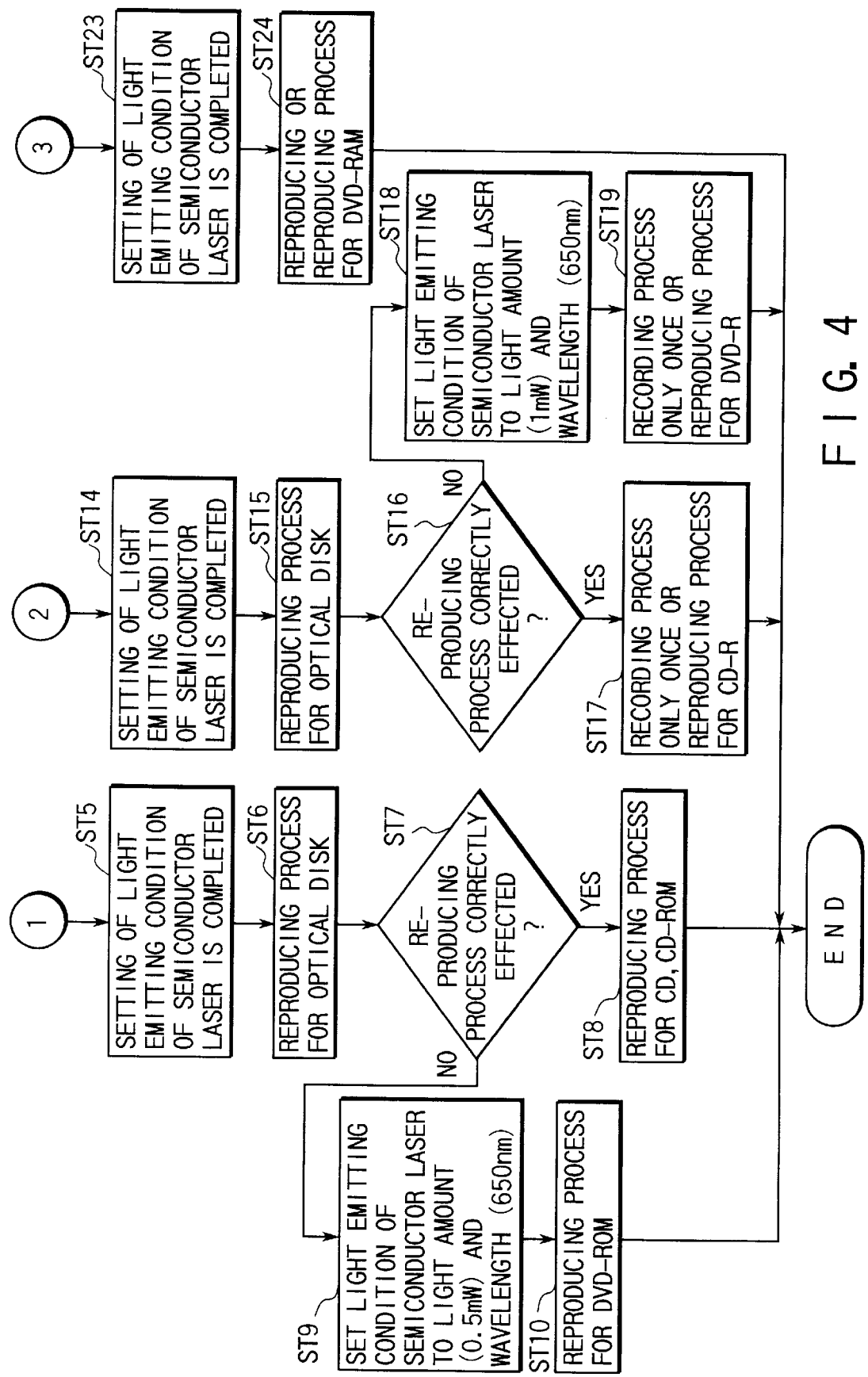

Next, the light amount control process of the semiconductor laser oscillator 19 effected when the optical disk 1 with the above construction is loaded is explained with reference to the flowchart shown in FIGS. 3 and 4.

That is, when the optical disk 1 is loaded (ST1), the light emission amount control circuit 41 is set to emit light of minimum light amount according to a switching signal from the CPU 30 and the set content is supplied to the light emission error signal generating circuit 43. Then, the light emission error signal generating circuit 43 sets the light emitting condition of the semiconductor laser oscillator 19 to the minimum light amount (0.3 mW) and the maximum wavelength (780 nm) according to the set content from the light emission amount control circuit 41 and controls the laser driving circuit 45 according to the set light emitting condition to drive the semiconductor laser oscillator 19 (ST2).

In this state, the CPU 30 sets the laser light from the optical head 5 to be applied to the innermost circumference of the optical disk 1 by moving the optical head 5, effects the initial focusing operation by controlling the focusing control circuit 27 to excite the driving coil 11, and determines whether or not a digital value corresponding to a reflection light amount supplied from the adder 26e via the A/D converter 32 is suitable for the optical disk 1 of CD, CD-ROM, DVD-ROM when the focused condition is attained (ST3, ST4).

At this time, when the optical disk 1 is a CD, CD-ROM or DVD-ROM, the reflectance thereof is 90 to 100%, when the optical disk 1 is a DVD-R or CD-R, the reflectance thereof is 70%, and when the optical disk 1 is a DVD-RAM, the reflectance thereof is 30%, and therefore, they can be distinguished from one another.

If it is determined by the CPU 30 that the digital value corresponding to the reflection light amount is suitable for the optical disk 1 of CD, CD-ROM or DVD-ROM, the operation of setting the light emitting condition of the semiconductor laser oscillator 19 is completed (ST5).

After this, the reproducing process for the loaded optical disk 1 is effected (ST6) in a state in which laser light of the minimum light amount (0.3 mW) and the wavelength (780 nm) is emitted from the semiconductor laser oscillator 19. As the result, if the reproducing process is correctly effected (ST7), the CPU 30 determines that a CD or CD-ROM is loaded and effects the reproducing process for the CD or CD-ROM (ST8). Whether the reproducing process is correctly effected or not can be determined by reading data recorded on the optical disk 1. For example, it can be determined by reading a sector ID or pre-header.

If the reproducing process is not correctly effected in the step ST7, the CPU 30 determines that a DVD-ROM is loaded, changes the set content of the light emission amount control circuit 41, causes the error signal generating circuit 43 to set the light emitting condition of the semiconductor laser oscillator 19 to the light amount (0.5 mW) and wavelength (650 nm), and controls the laser driving circuit 45 according to the set light emitting condition to drive the semiconductor laser oscillator 19 (ST9). Thus, the reproducing process with respect to the DVD-ROM is effected by the CPU 30 (ST10).

If it is not determined in the step ST4 that the digital value corresponding to the reflection light amount is suitable for the optical disk 1 of CD, CD-ROM, DVD-ROM, the CPU 30 changes the set content of the light emission amount control circuit 41, causes the error signal generating circuit 43 to set the light emitting condition of the semiconductor laser oscillator 19 to the light amount (0.5 mW) larger than the minimum light amount by one level and the maximum wavelength (780 nm), and controls the laser driving circuit 45 according to the set light emitting condition to drive the semiconductor laser oscillator 19 (ST11).

In this state, the CPU 30 sets the laser light from the optical head 5 to be applied to the innermost circumference of the optical disk 1 by moving the optical head 5, effects the focusing operation by controlling the focusing control circuit 27 to excite the driving coil 11, and determines whether or not a digital value corresponding to a reflection light amount supplied from the adder 26e via the A/D converter 32 is suitable for the optical disk 1 of CD-R or DVD-R when the focused condition is attained (ST12, ST13).

If it is determined by the CPU 30 that the digital value corresponding to the reflection light amount is suitable for the optical disk 1 of CD-R or DVD-R, the operation of setting the light emitting condition of the semiconductor laser oscillator 19 is completed (ST14).

After this, the reproducing process for the loaded optical disk 1 is effected (ST15) in a state in which laser light of the light amount (0.5 mW) and the wavelength (780 nm) is emitted from the semiconductor laser oscillator 19. As the result, if the reproducing process is correctly effected (ST16), the CPU 30 determines that a CD-R is loaded and effects the recording process only once or the reproducing process for the CD-R (ST17).

If the reproducing process is not correctly effected in the step ST16, the CPU 30 determines that a DVD-R is loaded, changes the set content of the light emission amount control circuit 41, causes the error signal generating circuit 43 to set the light emitting condition of the semiconductor laser oscillator 19 to the light amount (1.0 mW) and wavelength (650 nm), and controls the laser driving circuit 45 according to the set light emitting condition to drive the semiconductor laser oscillator 19 (ST18). Thus, the recording process of only one time or the reproducing process with respect to the DVD-R is effected by the CPU 30 (ST19).

If it is not determined in the step ST13 that the digital value corresponding to the reflection light amount is suitable for the optical disk 1 of CD-R, DVD-R, the CPU 30 changes the set content of the light emission amount control circuit 41, causes the error signal generating circuit 43 to set the light emitting condition of the semiconductor laser oscillator 19 to the light amount (1 mW) larger than the minimum light amount by two levels and the wavelength (650 nm) shorter than the maximum wavelength, and controls the laser driving circuit 45 according to the set light emitting condition to drive the semiconductor laser oscillator 19 (ST20).

In this state, the CPU 30 sets the laser light from the optical head 5 to be applied to the innermost circumference of the optical disk 1 by moving the optical head 5, effects the focusing operation by controlling the focusing control circuit 27 to excite the driving coil 11, and determines whether or not a digital value corresponding to a reflection light amount supplied from the adder 26e via the A/D converter 32 is suitable for the optical disk 1 of DVD-RAM when the focused condition is attained (ST21, ST22).

If it is determined by the CPU 30 that the digital value corresponding to the reflection light amount is suitable for the optical disk 1 of DVD-RAM, the operation of setting the light emitting condition of the semiconductor laser oscillator 19 is completed (ST23).

After this, the recording process or the reproducing process for the loaded optical disk 1 of DVD-RAM is effected (ST24).

If it is not determined in the step ST22 that the digital value corresponding to the reflection light amount is suitable for the optical disk 1 of DVD-RAM, the CPU 30 effects the error process and ejects the optical disk 1.

As described above, in the optical disk device capable of dealing with various types of optical disks, the amounts of light are set for the various types of optical disks by emitting laser light from the semiconductor laser oscillator while sequentially increasing the light amount thereof for the optical disks in an order from the optical disk of the smallest set light amount.

That is, first, whether or not an optical disk of CD, CD-ROM or DVD-ROM can be suitably used is determined based on the amount of reflection light from the optical disk obtained by causing the semiconductor laser oscillator to emit laser light in the smallest light amount setting state, and if it is not determined that the optical disk can be suitably used, the light amount is increased to a level higher than the lowest light amount set level by one level. In this state, whether or not an optical disk of CD-R or DVD-R can be suitably used is determined based on the amount of reflection light from the optical disk obtained by causing the semiconductor laser oscillator to emit laser light, and if it is not determined that the optical disk can be suitably used, the light amount is increased to a level higher than the smallest light amount set level by two levels, and in this state, whether or not an optical disk of DVD-RAM can be suitably used is determined based on the amount of reflection light from the optical disk obtained by causing the semiconductor laser oscillator to emit laser light.

As a result, application of laser light of an amount larger than the adequate amount to the loaded optical disk can be prevented without using a special sensor and there is no possibility that data (information) on the optical disk will be destroyed.

Since the wavelength is changed when an optical disk of DVD and an optical disk of CD are checked, the wavelength dependency is also taken into consideration.

In the above example, whether the optical disk is adequate or not is checked based on the reflection light amount, but the checking method is not limited to this and it is possible to actually read out data from the optical disk and check whether the optical disk is adequate or not according to whether or not data can be correctly read. In this case, the determination can be made by use of data reproduced by the data reproducing circuit 18.

Further, in the above example, after the operation for focusing the laser light on the optical disk is effected by use of the optical head, whether the optical disk is adequate or not is checked based on the amount of reflection light from the optical disk caused by the laser light, but the method is not limited to this and it is possible to check whether the optical disk is adequate or not based on the range of the amplitude (proportional to the reflectance of the optical disk) of the amount of reflection light from the optical disk before the operation for focusing the laser light on the optical disk is effected by use of the optical head. Since the above checking operation can be effected without effecting the focusing operation, data on the optical disk will not be destroyed even if the light amount is erroneously set.

Figure 5:
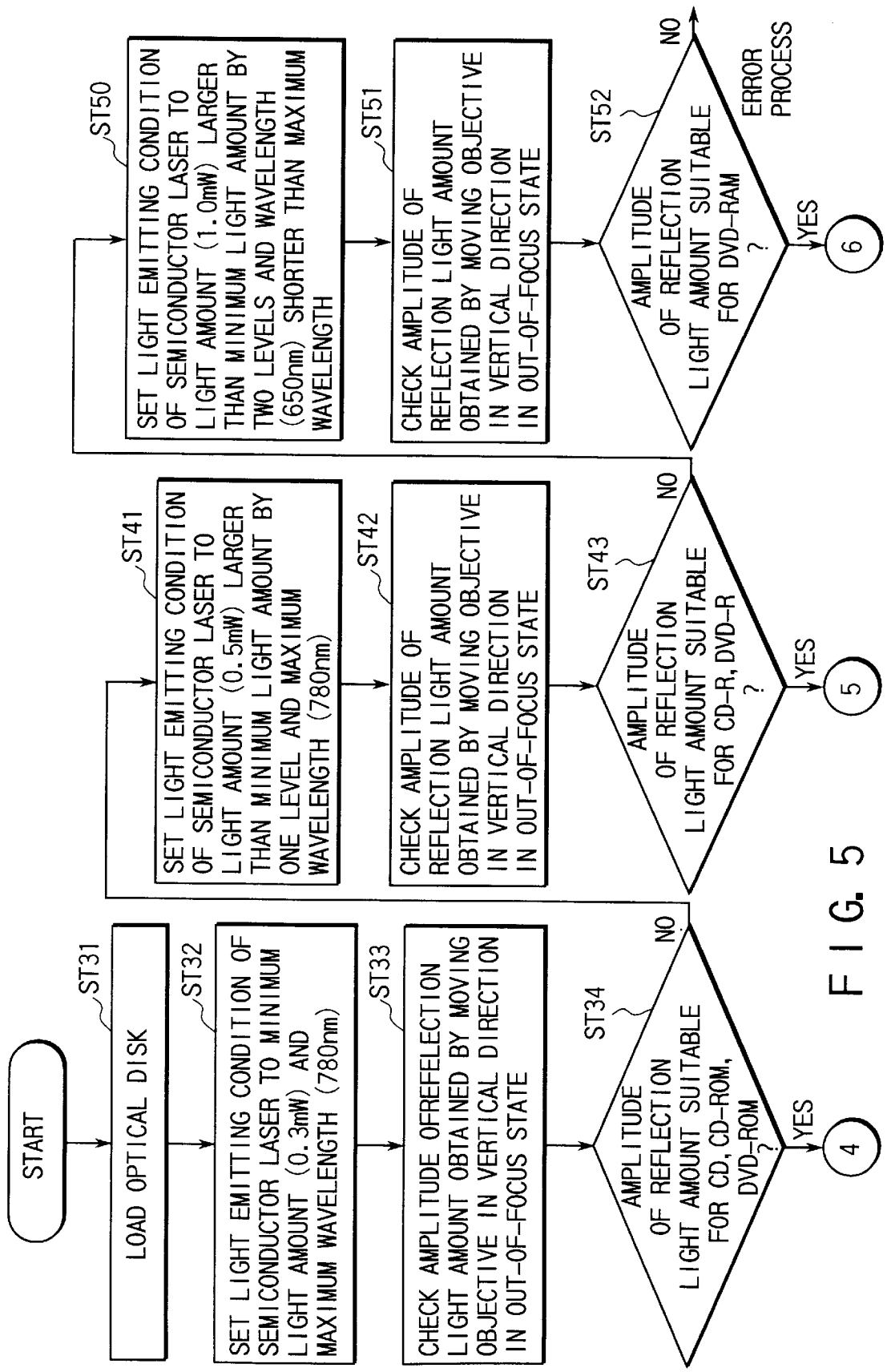
Figure 6:
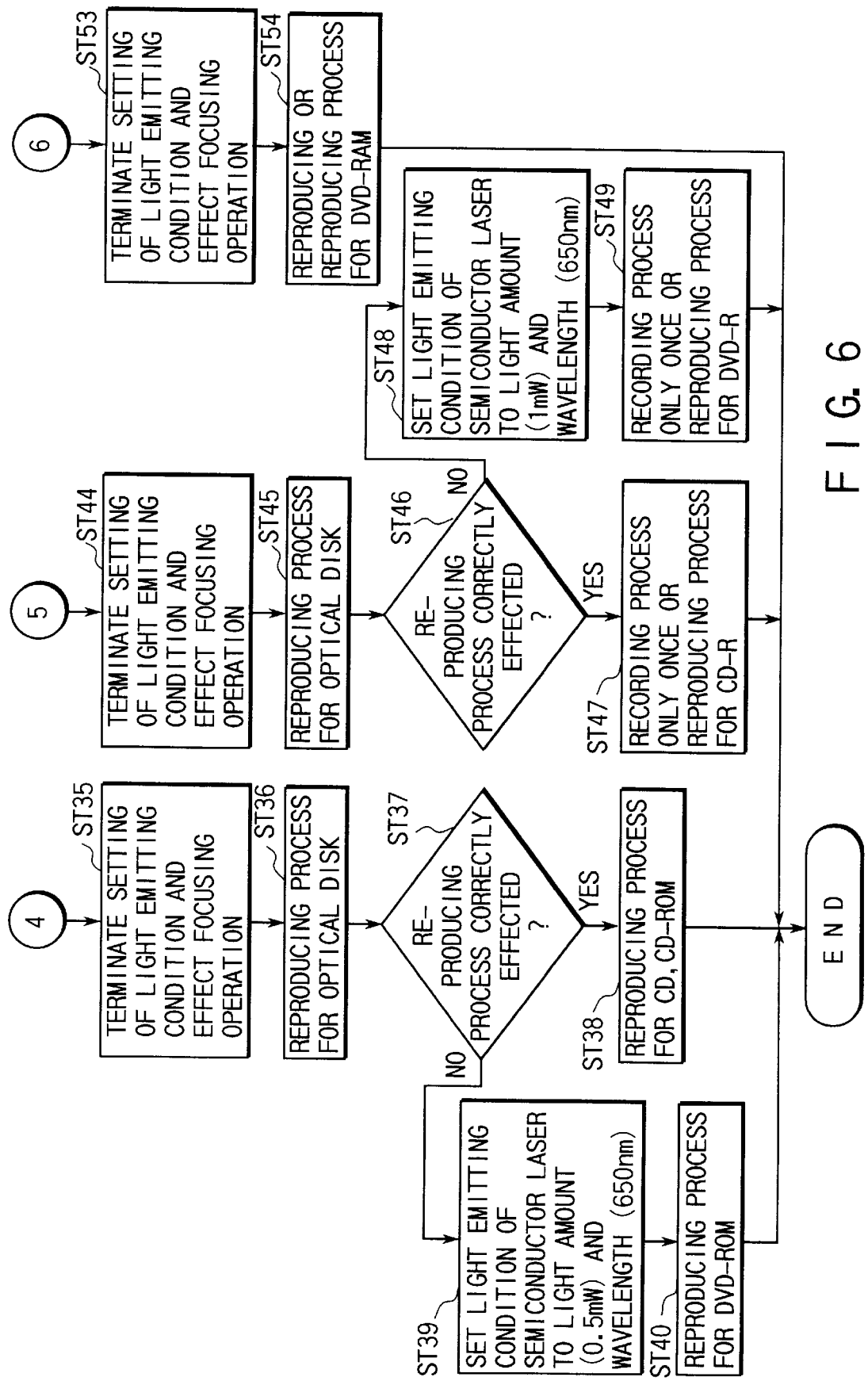

The light amount control process of the semiconductor laser oscillator 19 at the time of loading of the optical disk 1 is explained with reference to the flowchart shown in FIGS. 5 and 6.

That is, when the optical disk 1 is loaded (ST31), the light emission amount control circuit 41 is set to emit light of minimum light amount according to a switching signal from the CPU 30 and the set content is supplied to the light emission error signal generating circuit 43. Then, the light emission error signal generating circuit 43 sets the light emitting condition of the semiconductor laser oscillator 19 to the minimum light amount (0.3 mW) and the maximum wavelength (780 nm) according to the set content from the light emission amount control circuit 41 and controls the laser driving circuit 45 according to the set light emitting condition to drive the semiconductor laser oscillator 19 (ST32).

In this state, the CPU 30 sets the laser light from the optical head 5 to be applied to the innermost circumference of the optical disk 1 by moving the optical head 5, controls the focusing control circuit 27 to excite the driving coil 11, checks the amplitude of the reflection light amount by use of a digital value corresponding to the reflection light amount and supplied from the adder 26e via the A/D converter 32 while moving the objective lens 10 in the vertical direction in an out-of-focus state, and determines whether or not the range of the amplitude is suitable for the optical disk 1 of CD, CD-ROM, DVD-ROM (ST33, ST34).

At this time, when the optical disk 1 is a CD, CD-ROM or DVD-ROM, the reflectance thereof is 90 to 100% and the amplitude changes in a wide range, when the optical disk 1 is a DVD-R or CD-R, the reflectance thereof is 70% and the amplitude changes in a range narrower than in the case of CD, CD-ROM or DVD-ROM, and when the optical disk 1 is a DVD-RAM, the reflectance thereof is 30% and the amplitude changes in a range narrower than in the case of DVD-R or CD-R, and therefore, they can be distinguished from one another.

If it is determined by the CPU 30 that the range of the amplitude of the reflection light amount is suitable for the optical disk 1 of CD, CD-ROM or DVD-ROM, the operation of setting the light emitting condition of the semiconductor laser oscillator 19 is completed and the CPU 30 effects the focusing operation by controlling the focusing control circuit 27 to excite the driving coil 11 (ST35).

After this, the reproducing process for the loaded optical disk 1 is effected (ST36) in a state in which laser light of the above light amount (0.3 mW) and the wavelength (780 nm) is emitted from the semiconductor laser oscillator 19. As the result, if the reproducing process is correctly effected (ST37), the CPU 30 determines that a CD or CD-ROM is loaded and effects the reproducing process for the CD or CD-ROM (ST38).

If the reproducing process is not correctly effected in the step ST37, the CPU 30 determines that a DVD-ROM is loaded, sets the light emitting condition of the semiconductor laser oscillator 19 to the light amount (0.5 mW) and wavelength (650 nm), and controls the laser driving circuit 45 according to the set light emitting condition to drive the semiconductor laser oscillator 19 (ST39). Thus, the reproducing process with respect to the DVD-ROM is effected by the CPU 30 (ST40).

If it is not determined in the step ST34 that the range of the amplitude of the reflection light amount is suitable for the optical disk 1 of CD, CD-ROM, DVDROM, the CPU 30 changes the set content of the light emission amount control circuit 41, causes the error signal generating circuit 43 to set the light emitting condition of the semiconductor laser oscillator 19 to the light amount (0.5 mW) larger than the minimum light amount by one level and the maximum wavelength (780 nm), and controls the laser driving circuit 45 according to the set light emitting condition to drive the semiconductor laser oscillator 19 (ST41).

In this state, the CPU 30 sets the laser light from the optical head 5 to be applied to the innermost circumference of the optical disk 1 by moving the optical head 5, controls the focusing control circuit 27 to excite the driving coil 11, checks the amplitude of the reflection light amount by use of a digital value corresponding to the reflection light amount and supplied from the adder 26e via the A/D converter 32 while moving the objective lens 10 in the vertical direction in an out-of-focus state, and determines whether or not the range of the amplitude of the reflection light amount is suitable for the optical disk 1 of CD-R or DVD-R (ST42, ST43).

If it is determined by the CPU 30 that the range of the amplitude of the reflection light amount is suitable for the optical disk 1 of CD-R or DVD-R, the operation of setting the light emitting condition of the semiconductor laser oscillator 19 is completed and the CPU 30 effects the focusing operation by controlling the focusing control circuit 27 to excite the driving coil 11 (ST44).

After this, the reproducing process for the loaded optical disk 1 is effected (ST45) in a state in which laser light of the above light amount (0.5 mW) and the wavelength (780 nm) is emitted from the semiconductor laser oscillator 19. As the result, if the reproducing process is correctly effected (ST46), the CPU 30 determines that a CD-R is loaded and effects the recording process only once or the reproducing process for the CD-R (ST47).

If the reproducing process is not correctly effected in the step ST46, the CPU 30 determines that a DVD-R is loaded, changes the set content of the light emission amount control circuit 41, causes the error signal generating circuit 43 to set the light emitting condition of the semiconductor laser oscillator 19 to the light amount (1.0 mW) and wavelength (650 nm), and controls the laser driving circuit 45 according to the set light emitting condition to drive the semiconductor laser oscillator 19 (ST48). Thus, the recording process of only one time or the reproducing process with respect to the DVD-R is effected by the CPU 30 (ST49).

If it is not determined in the step ST43 that the range of the amplitude of the reflection light amount is suitable for the optical disk 1 of CD-R, DVD-R, the CPU 30 changes the set content of the light emission amount control circuit 41, causes the error signal generating circuit 43 to set the light emitting condition of the semiconductor laser oscillator 19 to the light amount (1 mW) larger than the minimum light amount by two levels and the wavelength (650 nm) shorter than the maximum wavelength, and controls the laser driving circuit 45 according to the set light emitting condition to drive the semiconductor laser oscillator 19 (ST50).

In this state, the CPU 30 sets the laser light from the optical head 5 to be applied to the innermost circumference of the optical disk 1 by moving the optical head 5, controls the focusing control circuit 27 to excite the driving coil 11, checks the amplitude of the reflection light amount by use of a digital value corresponding to the reflection light amount and supplied from the adder 26e via the A/D converter 32 while moving the objective lens 10 in the vertical direction in an out-of-focus state, and determines whether or not the range of the amplitude of the reflection light amount is suitable for the optical disk 1 of DVD-RAM (ST51, ST52).

If it is determined by the CPU 30 that the range of the amplitude of the reflection light amount is suitable for the optical disk 1 of DVD-RAM, the operation of setting the light emitting condition of the semiconductor laser oscillator 19 is completed and the CPU 30 effects the focusing operation by controlling the focusing control circuit 27 to excite the driving coil 11 (ST53).

After this, the recording process or the reproducing process for the loaded optical disk 1 of DVD-RAM is effected (ST54).

If it is not determined in the step ST52 that the range of the amplitude of the reflection light amount is suitable for the optical disk 1 of DVD-RAM, the CPU 30 effects the error process and ejects the optical disk 1.

As described above, in the optical disk device capable of dealing with various types of optical disks, the amounts of light are set for the various types of optical disks by emitting laser light from the semiconductor laser oscillator while sequentially increasing the light amount thereof for the optical disks in an order from the optical disk of the smallest set light amount.

That is, first, whether or not an optical disk of CD, CD-ROM or DVD-ROM can be suitably used is determined based on the range of the amplitude of the amount of reflection light from the optical disk obtained by causing the semiconductor laser oscillator to emit laser light in the smallest light amount setting state, and if it is not determined that the optical disk can be suitably used, the light amount is increased to a level higher than the lowest light amount set level by one level. In this state, whether or not an optical disk of CD-R or DVD-R can be suitably used is determined based on the range of the amplitude of the amount of reflection light from the optical disk obtained by causing the semiconductor laser oscillator to emit laser light, and if it is not determined that the optical disk can be suitably used, the light amount is increased to a level higher than the lowest light amount set level by two levels, and in this state, whether or not an optical disk of DVD-RAM can be suitably used is determined based on the range of the amplitude of the amount of reflection light from the optical disk obtained by causing the semiconductor laser oscillator to emit laser light.

As a result, application of laser light of an amount larger than the adequate amount to the loaded optical disk can be prevented without using a special sensor and there is no possibility that data (information) on the optical disk will be destroyed.

Since the wavelength is changed when an optical disk of DVD and an optical disk of CD are checked, the wavelength dependency is also taken into consideration.

In the above example, whether the optical disk is adequate or not is checked based on the reflection light amount, but the checking method is not limited to this and it is possible to actually read out data from the optical disk and check whether the optical disk is adequate or not according to whether or not data can be correctly read. In this case, the determination can be made by use of data reproduced by the data reproducing circuit 18.

Further, in the above example, the optical disk device for recording data on an optical disk or reproducing data recorded on an optical disk is explained, but this is not limitative and this invention can also be applied to a reproduction-only optical disk device for reproducing data recorded on optical disks.

In this case, the optical head 5 shown in FIG. 1 is exclusively used for reproduction and the semiconductor laser oscillator 19 in the optical head 5 is designed to emit only laser light exclusively used for reproduction. Further, as shown in FIG. 7, the laser control circuit 13 has a construction obtained by omitting the modulation circuit of the laser control circuit 13 of FIG. 2. With this construction, the laser driving circuit 45 in the laser control circuit 13 is used exclusively for reproduction and drives the semiconductor laser oscillator 19 in the optical head 5 according to a driving current corresponding to a voltage applied from the light emission error signal generating circuit 43.

The error correction circuit 32 is constructed to correct errors by use of an error correction code ECC in the reproduced data.

Figure 8:
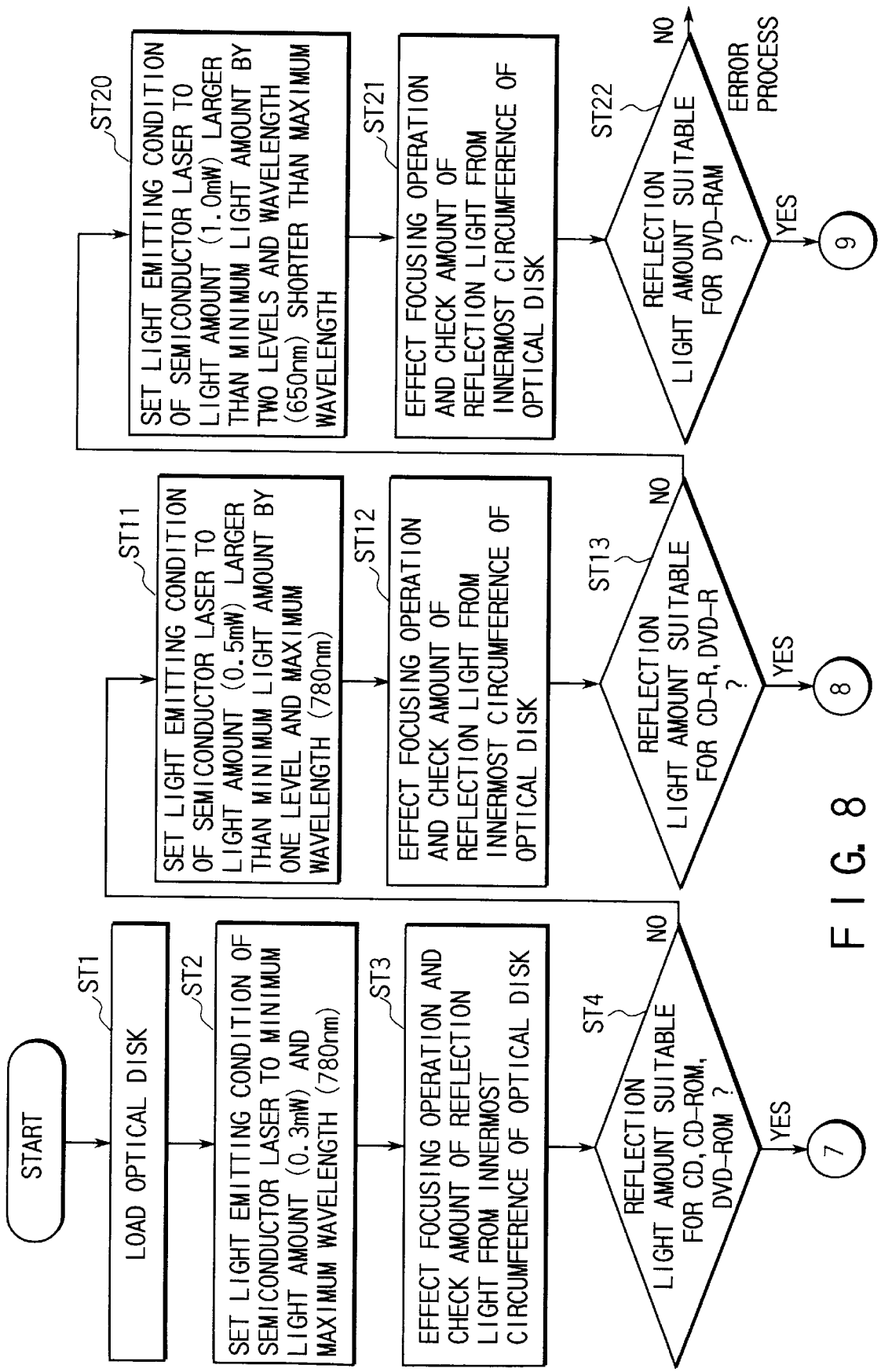
FIGS. 8, 9, 10 and 11 are flowcharts for illustrating the light amount controlling process of a semiconductor laser oscillator of another embodiment.
Figure 9:
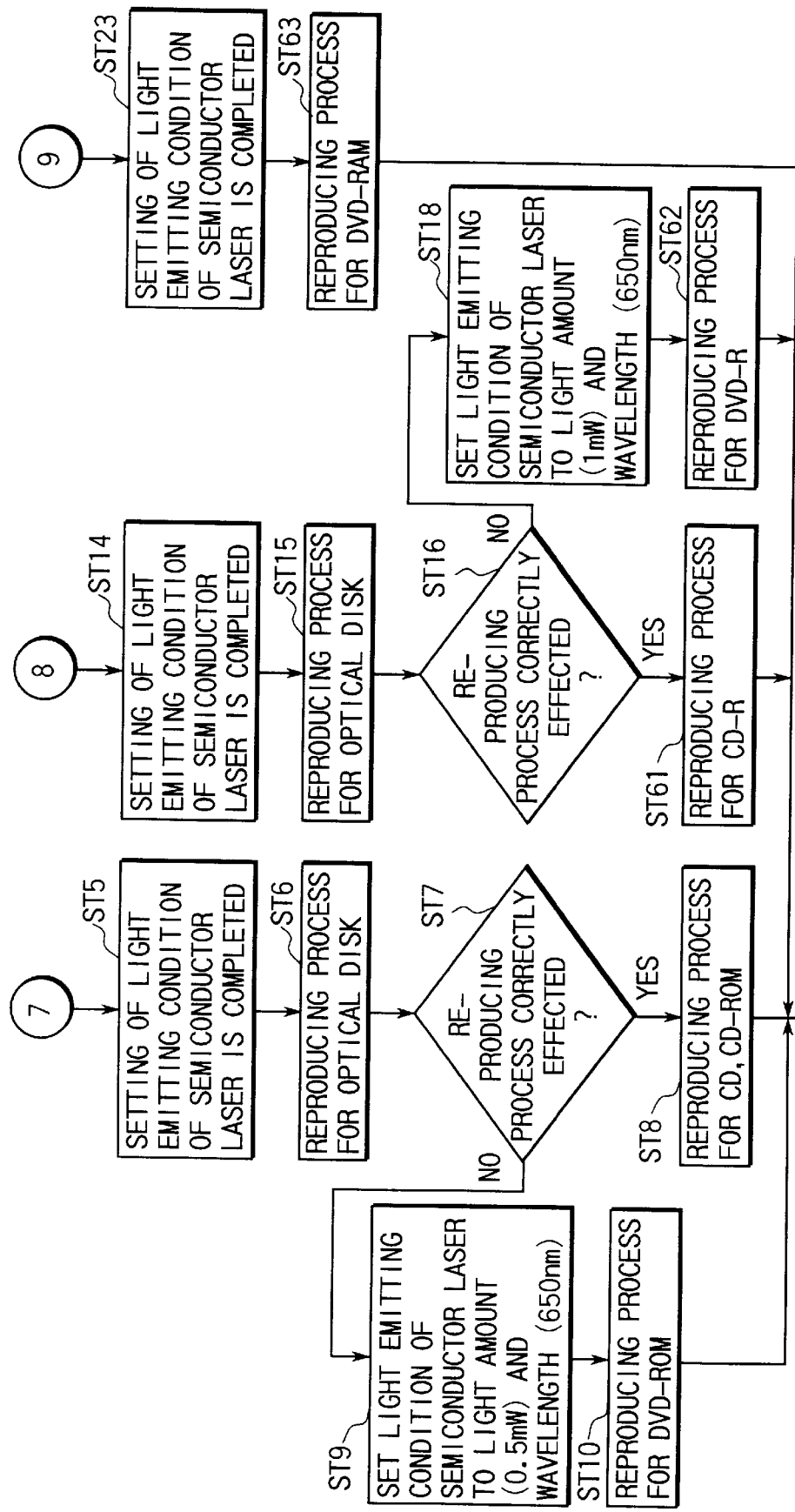

With the above construction, the light amount control process of the semiconductor laser oscillator 19 effected at the time of loading of the optical disk 1 by checking whether or not the optical disk 1 is suitable based on the amount of reflection light from the optical disk 1 caused by laser light from the optical head 5 after the operation of focusing the laser light on the optical disk 1 is effected is explained with reference to the flowchart shown in FIGS. 8 and 9. In this case, since the process is similar to the process shown in FIGS. 3 and 4, only different portions are explained while the step numbers thereof are changed.

That is, if it is determined in the step ST16 that the reproducing process is correctly effected, the CPU determines that a CD-R is loaded and effects the reproducing process for the CD-R (ST61). Further, when the light emitting condition of the semiconductor laser oscillator 19 is set to the light amount (1.0 mW) and the wavelength (650 nm) in the step ST18, the reproducing process for a DVD-R is effected (ST62). When the light emitting condition setting operation for the semiconductor laser oscillator 19 is completed in the step ST23, the reproducing process for the loaded optical disk 1 of DVD-RAM is effected (ST63).

Figure 10:
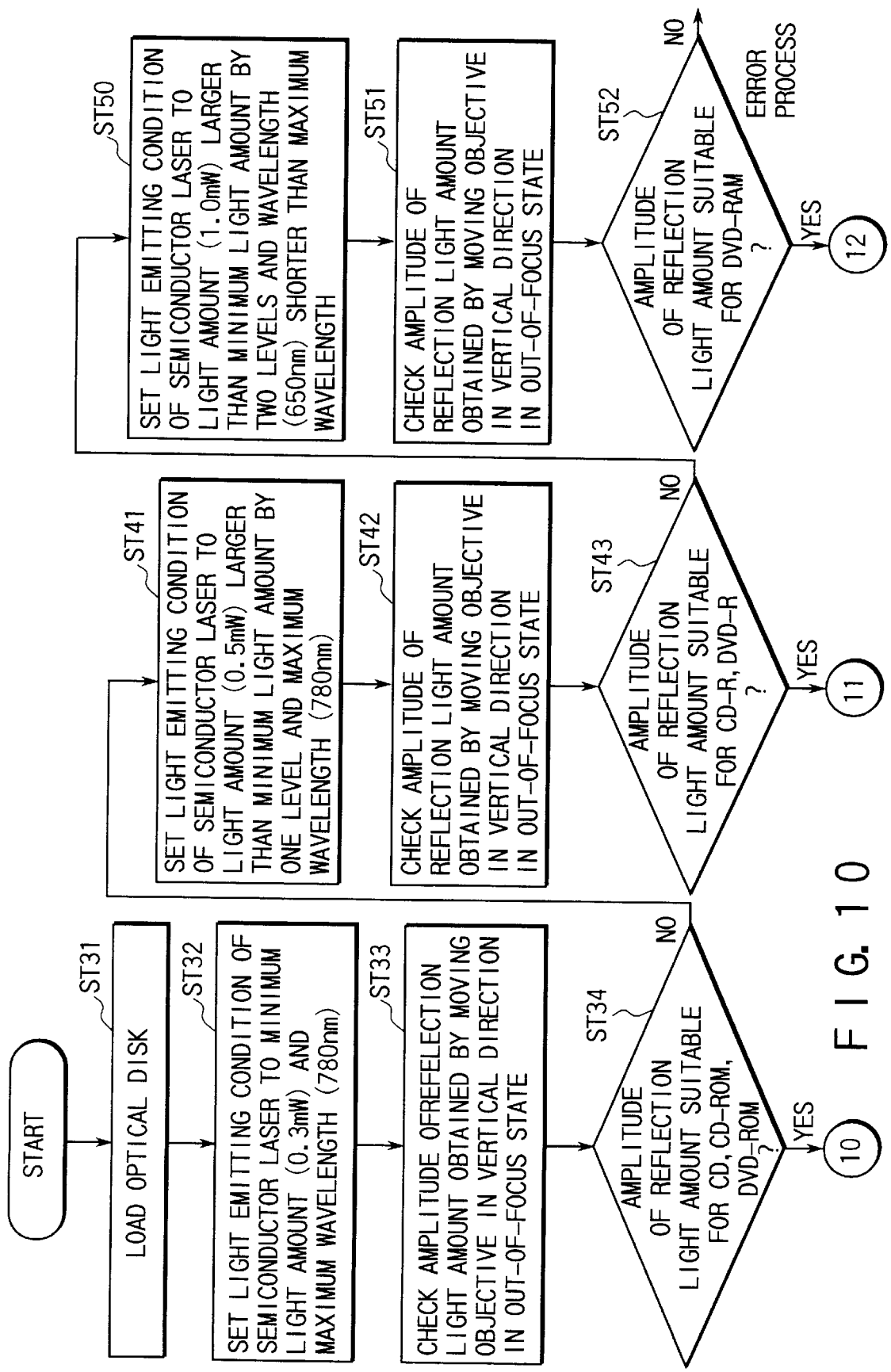
Figure 11:
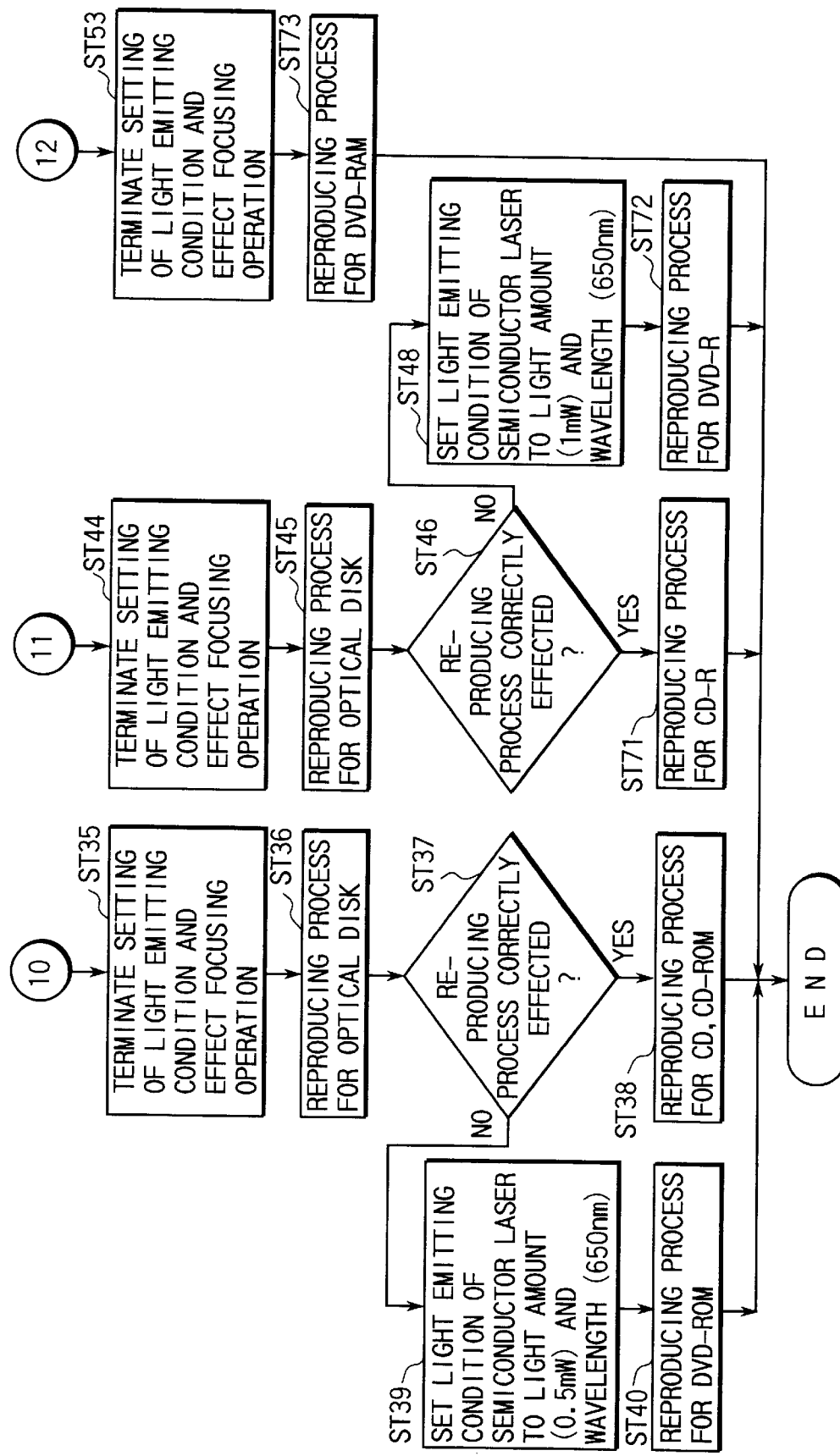

Next, the light amount control process of the semiconductor laser oscillator 19 effected at the time of loading of the optical disk 1 by checking whether the optical disk 1 is suitable or not based on the range of the amplitude (proportional to the reflectance) of the amount of reflection light from the optical disk 1 caused by laser light from the optical head 5 before the operation of focusing the laser light on the optical disk 1 is effected is explained with reference to the flowchart shown in FIGS. 10 and 11. In this case, since the process is similar to the process shown in FIGS. 5 and 6, only different portions are explained while the step numbers thereof are changed.

That is, if it is determined in the step ST46 that the reproducing process is correctly effected, the CPU determines that a CD-R is loaded and effects the reproducing process for the CD-R (ST71). Further, when the light emitting condition of the semiconductor laser oscillator 19 is set to the light amount (1.0 mW) and the wavelength (650 nm) in the step ST48, the reproducing process for a DVD-R is effected (ST72). When the light emitting condition setting operation for the semiconductor laser oscillator 19 is completed in the step ST53, the reproducing process for the loaded optical disk 1 of DVD-RAM is effected (ST73).

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. An optical disk device for recording data on an optical disk or reproducing data recorded on an optical disk, comprising:

laser light emitting means for selectively emitting laser light of first light amount or laser light of a second light amount larger than the first light amount;

photoelectric converting means for photoelectrically converting reflection light obtained by applying laser light emitted from said laser light emitting means to said optical disk and supplying a corresponding output;

first processing means for driving said laser light emitting means to emit laser light of the first light amount;

first determining means for determining whether an optical disk whose recording or reproducing operation is effected by use of the laser light of the first light amount is loaded or not according to an output derived from said photoelectric converting means while the process by said first processing means is effected;

first execution means for effecting the recording or reproducing operation by use of laser light of the first light amount when said first determining means determines that an optical disk whose recording or reproducing operation is effected by use of the laser light of the first light amount is loaded;

second processing means for driving said laser light emitting means to emit laser light of the second light amount larger than the first light amount when said first determining means determines that an optical disk whose recording or reproducing operation is effected by use of the laser light of the first light amount is not loaded;

second determining means for determining whether an optical disk whose recording or reproducing operation is effected by use of laser light of the second light amount is loaded or not according to an output derived from said photoelectric converting means while the process by said second processing means is effected; and second execution means for effecting the recording or reproducing operation by use of laser light of the second light amount when said second determining means determines that an optical disk whose recording or reproducing operation is effected by use of the laser light of the second light amount is loaded.

2. An optical disk device for reproducing data recorded on an optical disk, comprising:

laser light emitting means for selectively emitting laser light of first light amount or laser light of a second light amount larger than the first light amount;

photoelectric converting means for photoelectrically converting reflection light obtained by applying laser light emitted from said laser light emitting means to said optical disk and supplying a corresponding output;

first processing means for driving said laser light emitting means to emit laser light of the first light amount;

first determining means for determining whether an optical disk whose reproducing operation is effected by use of the laser light of the first light amount is loaded or not according to an output derived from said photoelectric converting means while the process by said first processing means is effected;

first execution means for effecting the reproducing operation by use of laser light of the first light amount when said first determining means determines that an optical disk whose reproducing operation is effected by use of the laser light of the first light amount is loaded;

second processing means for driving said laser light emitting means to emit laser light of the second light amount larger than the first light amount when said first determining means determines that an optical disk whose reproducing operation is effected by use of the laser light of the first light amount is not loaded;

second determining means for determining whether an optical disk whose reproducing operation is effected by use of laser light of the second light amount is loaded or not according to an output derived from said photoelectric converting means while the process by said second processing means is effected; and second execution means for effecting the reproducing operation by use of laser light of the second light amount when said second determining means determines that an optical disk whose reproducing operation is effected by use of the laser light of the second light amount is loaded.

3. An optical disk device for reproducing data recorded on an optical disk, comprising:

laser light emitting means for selectively emitting laser light of first light amount and first frequency, laser light of a second light amount larger than the first light amount and the first frequency, or laser light of third light amount larger than the second light amount and a second frequency higher than the first frequency;

photoelectric converting means for photoelectrically converting reflection light obtained by applying laser light of one of the first to third light amounts emitted from said laser light emitting means to said optical disk and supplying a corresponding output;

first processing means for driving said laser light emitting means to emit laser light of the first light amount and first frequency;

first determining means for determining whether an optical disk whose reproducing operation is effected by use of the laser light of the first light amount and first frequency is loaded or not according to an output derived from said photoelectric converting means while the process by said first processing means is effected;

first execution means for effecting the reproducing operation by use of laser light of the first light amount when said first determining means determines that an optical disk whose reproducing operation is effected by use of the laser light of the first light amount and first frequency is loaded;

second processing means for driving said laser light emitting means to emit laser light of the second light amount larger than the first light amount and first frequency when said first determining means determines that an optical disk whose reproducing operation is effected by use of the laser light of the first light amount and first frequency is not loaded;

second determining means for determining whether an optical disk whose reproducing operation is effected by use of laser light of the second light amount and first frequency is loaded or not according to an output derived from said photoelectric converting means while the process by said second processing means is effected;

second execution means for effecting the reproducing operation by use of laser light of the second light amount and first frequency when said second determining means determines that an optical disk whose reproducing operation is effected by use of the laser light of the second light amount and first frequency is loaded;

third processing means for driving said laser light emitting means to emit laser light of the third light amount larger than the second light amount and the second frequency when said second determining means determines that an optical disk whose reproducing operation is effected by use of the laser light of the second light amount and first frequency is not loaded;

third determining means for determining whether an optical disk whose reproducing operation is effected by use of laser light of the third light amount and second frequency is loaded or not according to an output derived from said photoelectric converting means while the process by said third processing means is effected; and third execution means for effecting the reproducing operation by use of laser light of the third light amount and second frequency when said third determining means determines that an optical disk whose reproducing operation is effected by use of the laser light of the third light amount and second frequency is loaded.

4. An optical disk device for reproducing data recorded on an optical disk, comprising:

laser light emitting means for selectively emitting laser light of first light amount and first frequency, laser light of a second light amount larger than the first light amount and the first frequency, or laser light of third light amount larger than the second light amount and a second frequency higher than the first frequency;

light converging means for converging the laser light of one of the first to third light amounts emitted from said laser light emitting means onto said optical disk;

moving means for moving said light converging means in a direction along the optical axis thereof;

detecting means for detecting the amplitude of an amount of reflection light obtained by applying laser light of one of the first to third light amounts emitted from said laser light emitting means by driving said laser light emitting means to said optical disk;

first processing means for driving said laser light emitting means to emit laser light of the first light amount and first frequency when said optical disk is loaded;

first determining means for determining whether an optical disk whose reproducing operation is effected by use of the laser light of the first light amount and first frequency is loaded or not based on the amplitude of an amount of reflection light detected by said detecting means while the process by said first processing means is effected;

first execution means for effecting the reproducing operation by use of laser light of the first light amount when said first determining means determines that an optical disk whose reproducing operation is effected by use of the laser light of the first light amount and first frequency is loaded;

second processing means for driving the laser light emitting means to emit laser light of the second light amount larger than the first light amount and first frequency when said first determining means determines that an optical disk whose reproducing operation is effected by use of the laser light of the first light amount and first frequency is not loaded;

second determining means for determining whether an optical disk whose reproducing operation is effected by use of laser light of the second light amount and first frequency is loaded or not based on the amplitude of an amount of reflection light detected by said detecting means while the process by said second processing means is effected;

second execution means for effecting the reproducing operation by use of laser light of the second light amount and first frequency when said second determining means determines that an optical disk whose reproducing operation is effected by use of the laser light of the second light amount and first frequency is loaded;

third processing means for driving said laser light emitting means to emit laser light of the third light amount larger than the second light amount and the second frequency higher than the first frequency when said second determining means determines that an optical disk whose reproducing operation is effected by use of the laser light of the second light amount is not loaded;

third determining means for determining whether an optical disk whose reproducing operation is effected by use of laser light of the third light amount and second frequency is loaded or not based on the amplitude of an amount of reflection light detected by said detecting means while the process by said third processing means is effected; and third execution means for effecting the reproducing operation by use of laser light of the third light amount and second frequency when said third determining means determines that an optical disk whose reproducing operation is effected by use of the laser light of the third light amount and second frequency is loaded.

* * * * *